June 3, 1969  G. G. VINCENT ET AL  3,447,460
PROCESS FOR MAKING LAMINATED PRINTING PLATES
Filed July 28, 1966

INVENTORS.
Gerald G. Vincent
BY Richard C. Lamos

ATTORNEY

United States Patent Office 3,447,460
Patented June 3, 1969

3,447,460
PROCESS FOR MAKING LAMINATED
PRINTING PLATES
Gerald G. Vincent and Richard C. Lamos, Midland, Mich., assignors to The Dow Chemical Company, Midland, Mich., a corporation of Delaware
Filed July 28, 1966, Ser. No. 568,556
Int. Cl. B41c 1/00; B41n 1/22; B32b 15/08
U.S. Cl. 101—401.1                                    1 Claim

ABSTRACT OF THE DISCLOSURE

Laminated printing plates comprise a thin metallic printing shell and a metallic backing sheet directly adhered together by means of an interlayer of a self-adhesive thermoplastic copolymer of ethylene and an ethylenically unsaturated acid such as acrylic acid.

---

This invention relates to laminated printing plates and, more particularly, to laminated printing plates comprising a thin metallic printing shell and a metallic backing sheet adhered together by means of an interlayer of a copolymer of ethylene and an ethylenically unsaturated carboxylic acid.

The art is familiar with printing plates wherein the shell is backed with a metallic layer such as a lead alloy. This type of construction has been proven to be disadvantageous since it is extremely heavy and therefore difficult to use particularly on rotary presses. The resulting centrifugal force of the rotating press causes the heavy printing plate to bend and produce an irregular shaped plate.

It has been attempted to overcome the undesirable characteristics of the lead alloy-backed printing shell by substituting, for said alloy, a plastic material which would also be suitable as a backing material. Polymer materials currently employed include copolymers of vinyl acetate and vinyl chloride or vinyl chloride and vinylidene chloride. These polymeric materials have proven to be suitable for the intended use, however, it is necessary to employ an adhesive layer between the polymer and printing shell and polymer and backing sheet. The use of the adhesive requires an additional step in the fabrication process, and also, increases the cost of the resulting printing plate. It would therefore be desirable to produce a printing plate which would employ an interlayer of a plastic material which would not require the use of an intermediate adhesive layer and yet offer the advantages of lighter weight and less total cost.

In accordance with the present invention, laminated printing plates having improved properties are obtained in a laminated construction comprising a thin metallic printing shell, a metallic backing sheet and interposed between said printing shell and backing sheet an interlayer of a copolymer of ethylene and an ethylenically unsaturated carboxylic acid, said interlayer being adherent to the printing shell and the metallic backing sheet.

Figure 1:
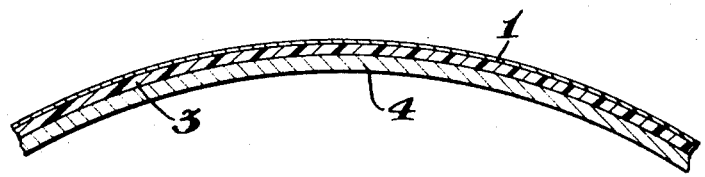
Figure 2:
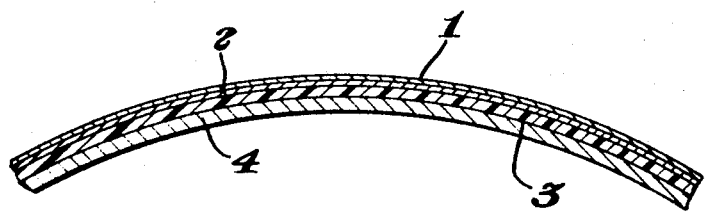

The invention will be more readily understood from the following drawing and description wherein:

FIGURE 1 is a cross-sectional view of the printing plates of the present invention, and FIGURE 2 is a cross-sectional view of a modification of the construction as shown in FIGURE 1.

Referring to the drawing, FIGURE 1 shows a laminated printing plate, which is illustrative of the invention, comprising a printing shell 1, a metal backing sheet 4, and therebetween a layer 3 of an adhesive thermoplastic material, more fully described hereinafter, which, by virtue of its properties, bonds directly to the printing shell 1 and to the metal backing sheet 4 thereby providing an integral laminate. The printing shell 1 can be of any conventional metal or construction employed in the art and can be formed in accordance with conventional procedures, usually having a thickness of at least 10 mils, and, therefore, does not require further description. Metals that may be employed as the printing shell include copper, chrome plate, nickel, aluminum, zinc, steel, and the like.

The interlayer 3 of adhesive thermoplastic material comprises a copolymer of a major proportion of ethylene and an acidic comonomer selected from $\alpha,\beta$-ethylenically unsaturated mono- and polycarboxylic acids and acid anhydrides having from 3 to 7 carbon atoms per molecule and partial esters of such polycarboxylic acids wherein the acid moiety has at least one carboxyl group and the alcohol moiety has from one to 20 carbon atoms. Specific examples of such acid comonomers include acrylic acid, methacrylic acid, crotonic acid, fumaric acid, maleic acid, itaconic acid, maleic anhydride, monomethyl maleate, monoethyl maleate, monomethyl fumarate and monoethyl fumarate. It is to be understood that random, graft and block compositions of the above-described copolymers can be employed in the invention. Excellent adhesive properties are provided in the copolymer when the ethylenically unsaturated carboxylic acid is present in an amount from about 3 percent to about 20 percent by weight and preferably from about 6 percent to about 10 percent by weight based on the weight of the copolymer. It is preferred that a graft copolymer be employed in the invention, e.g., polyethylene and acrylic acid. The thickness of the copolymer layer to be employed should be at least 50 mils and preferably from about 60 to about 170 mils.

The backing sheet 4 is of conventional thickness and size, usually having a thickness of at least 50 mils, and is a smooth surfaced or perforated sheet of metal. Metals such as copper, chrome plate, nickel, aluminum, zinc or steel may be employed in the backing sheet 4. The use of a perforated backing sheet offers the additional advantage wherein the polymer layer flows into the perforations during the fabrication process providing a better adhesive bond between the backing sheet 4 and thermoplastic layer 3.

FIGURE 2 shows a modified construction of the laminated printing plate shown in FIGURE 1 wherein the thin metallic printing shell 1 is backed with a layer 2 of a suitable backing material, said backing material being of a soft metal offering additional support and strength where very thin metallic materials are used in the printing shell 1. The layer 2 is adhesively bonded to the adhesive thermoplastic layer 3 and layer 3 is in turn adhesively bonded to the metallic backing sheet 4.

Means for assembling the laminated plates of this invention will be evident to those skilled in the art from the present description. The specified self-adhesive thermoplastic layer (element 3 in the figures of the drawing) can be provided by the artisan in any desired manner. A sheet of the thermoplastic material in the selected thickness is convenient to use and is usually preferred for assembling between the printing shell and the backing shell of the laminate prior to consolidation under heat and pressure.

The construction of printing plates according to the present invention provides protection for the printing shell where the metallic backing sheet is susceptible to damage during printing operations. Although the backing sheet may be cracked or broken, the use in accordance with the invention of the layer of the adhesive copolymer of ethylene and an ethylenically unsaturated carboxylic acid prevents the crack or break from continuing through the polymer layer and damaging the printing shell. Laminates currently being used in the art do not offer this protection. Furthermore, since the polymeric material employed in the thermoplastic layer 3 has excellent adhesive properties, the laminate construction of the invention does not require the use of intermediate adhesives to adhere the polymer layer 3 to the printing shell 1 and backing sheet 4. The resulting construction offers the additional advantages of lighter weight and less cost.

As an example of the invention, a laminated printing plate is made by placing on an aluminum backing sheet 100 mils thick a layer of a graft copolymer of high density polyethylene and acrylic acid (8 percent by weight) having a thickness of about 55 mils and placing on the copolymer layer a conventional copper printing shell having a thickness of about 12 mils. The structure is placed between the platens of a hydraulic press and subjected to a temperature of about 300° F. and a pressure of about 125 p.s.i. for a period of about 3 minutes. The temperature is lowered to 100° F. while maintaining the pressure and pressure is subsequently released and the resulting laminated product is removed from the press. The printing shell is firmly bonded to the backing sheet through the interlayer of the adhesive graft copolymer.

It is to be understood that the above procedure may be employed to produce flat or arcuate-shaped printing plates depending upon the intended use.

In place of the particular copolymer employed in the above example, other copolymers may be employed as hereinbefore described to obtain substantially the same results.

What is claimed is:

1. A process for making a laminated printing plate comprising a copper printing shell having a thickness of about 12 mils adhered to an aluminum backing sheet having a thickness of about 100 mils through an interlayer of a copylymer of ethylene and acrylic acid having a thickness of about 55 mils, said process comprising (1) applying the layer of said copolymer to the aluminum backing sheet, (2) placing on said copolymer layer the copper printing shell, (3) placing the resulting structure into a press, (4) subjecting the structure to temperature of about 300° F. and pressure of about 125 pounds per square inch for a period of about 3 minutes, (5) lowering the temperature to about 100° F. while maintaining the pressure, and (6) then releasing the pressure.

References Cited

UNITED STATES PATENTS

| 3,027,346 | 3/1962 | Rugg et al. | |
| 3,029,730 | 4/1962 | Parrish et al. | 101—395 XR |
| 3,062,139 | 11/1962 | Myers | 101—401.1 |
| 3,211,091 | 10/1965 | Garrett | 101—401.1 |
| 3,264,272 | 8/1966 | Rees | 161—216 XR |
| 3,270,090 | 8/1966 | Nowak | 161—216 XR |

DAVID KLEIN, *Primary Examiner.*

U.S. Cl. X.R.

101—395; 156—332, 334; 161—216